United States Patent
Chrysanthakopoulos et al.

(10) Patent No.: US 10,379,775 B2
(45) Date of Patent: Aug. 13, 2019

(54) NOTIFICATION SERVICE IN A DECENTRALIZED CONTROL PLANE OF A COMPUTING SYSTEM

(71) Applicant: VMware, Inc., Palo Alto, CA (US)

(72) Inventors: Georgios Chrysanthakopoulos, Seattle, WA (US); Pieter Noordhuis, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 15/195,532

(22) Filed: Jun. 28, 2016

(65) Prior Publication Data

US 2017/0371723 A1 Dec. 28, 2017

Related U.S. Application Data

(60) Provisional application No. 62/355,541, filed on Jun. 28, 2016.

(51) Int. Cl.
*G06F 3/06* (2006.01)
*G06F 9/54* (2006.01)
(Continued)

(52) U.S. Cl.
CPC ............ *G06F 3/0647* (2013.01); *G06F 3/064* (2013.01); *G06F 3/0608* (2013.01); *G06F 3/0652* (2013.01); *G06F 3/0659* (2013.01); *G06F 3/0673* (2013.01); *G06F 8/315* (2013.01); *G06F 9/5027* (2013.01); *G06F 9/541* (2013.01); *G06F 9/542* (2013.01); *G06F 16/2228* (2019.01); *G06F 16/23* (2019.01); *G06F 16/245* (2019.01); *H04L 41/0893* (2013.01); *H04L 41/20* (2013.01); *H04L 67/02* (2013.01);
(Continued)

(58) Field of Classification Search
None
See application file for complete search history.

(56) References Cited

U.S. PATENT DOCUMENTS 5,214,644 A    5/1993  Ikezaki
6,681,306 B1   1/2004  Kessler et al.
(Continued)

OTHER PUBLICATIONS

Diego Kreutz et al., "Towards Secure and Dependable Software-Defined Networks", pp. 1-6, Aug. 16, 2013.
(Continued)

*Primary Examiner* — Syed A Roni
(74) *Attorney, Agent, or Firm* — Patterson + Sheridan, LLP

(57) ABSTRACT

A method of providing notifications in a control plane of a computer system includes executing a service host process of the control plane on a software platform of the computer system, the service host process managing services of the control plane and a persistent document store that stores service states for the services. The method may include creating a query task service of the control plane, a service state of the query task service including a query filter; evaluating each of the service states against the query filter as each of the service states is added to the persistent document store; updating the service state of the query task service for each of the service states that satisfies the query filter; and sending a notification to a plurality of subscribers of the query task service in response to each update to the service state of the query task service.

20 Claims, 10 Drawing Sheets

(51) Int. Cl.
  *G06F 16/23* (2019.01)
  *G06F 16/245* (2019.01)
  *G06F 16/22* (2019.01)
  *H04L 29/08* (2006.01)
  *G06F 8/30* (2018.01)
  *H04L 12/24* (2006.01)
  *H04L 29/06* (2006.01)
  *G06F 9/50* (2006.01)

(52) U.S. Cl.
  CPC ............ *H04L 67/10* (2013.01); *H04L 67/104* (2013.01); *H04L 67/1095* (2013.01); *H04L 67/16* (2013.01); *H04L 67/32* (2013.01); *H04L 67/327* (2013.01); *H04L 67/42* (2013.01); *G06F 2209/5011* (2013.01)

(56) References Cited

U.S. PATENT DOCUMENTS

| | | | |
|---|---|---|---|
| 6,832,239 B1 | 12/2004 | Kraft et al. |
| 6,957,438 B1 | 10/2005 | Travostino et al. |
| 7,096,329 B2 | 8/2006 | Garthwaite |
| 7,299,277 B1 | 11/2007 | Moran et al. |
| 7,313,661 B1 | 12/2007 | Dmitriev |
| 7,325,106 B1 | 1/2008 | Dmitriev et al. |
| 7,340,494 B1 | 3/2008 | Detlefs et al. |
| 7,469,324 B2 | 12/2008 | Tene et al. |
| 7,653,793 B1 | 1/2010 | Garthwaite |
| 8,111,707 B2 | 2/2012 | Riddle et al. |
| 8,185,651 B2 | 5/2012 | Moran et al. |
| 8,607,067 B1 | 12/2013 | Janse van Rensburg et al. |
| 8,694,562 B2 | 4/2014 | Basu et al. |
| 9,167,501 B2 | 10/2015 | Kempf et al. |
| 9,229,754 B2 | 1/2016 | Soundararajan et al. |
| 9,257,092 B2 | 2/2016 | Spracklen et al. |
| 9,792,163 B1 | 10/2017 | Chrysanthakopoulos et al. |
| 9,898,614 B1 | 2/2018 | Muniswamy Reddy et al. |
| 9,910,881 B1 * | 3/2018 | Brooker |
| 2004/0044873 A1 | 3/2004 | Wong et al. |
| 2004/0128395 A1 | 7/2004 | Miyazaki |
| 2004/0172507 A1 | 9/2004 | Garthwaite |
| 2005/0166025 A1 | 7/2005 | Wong et al. |
| 2007/0072163 A1 | 3/2007 | Groff et al. |
| 2009/0248517 A1 | 10/2009 | Tran et al. |
| 2010/0100579 A1 | 4/2010 | Tsai |
| 2011/0082928 A1 | 4/2011 | Hasha et al. |
| 2011/0125873 A1 | 5/2011 | Pacella et al. |
| 2011/0219229 A1 | 9/2011 | Cholas et al. |
| 2011/0286470 A1 | 11/2011 | Dec et al. |
| 2012/0151063 A1 | 6/2012 | Yang et al. |
| 2012/0184258 A1 | 7/2012 | Kovvali et al. |
| 2013/0007218 A1 | 1/2013 | Shah et al. |
| 2013/0013688 A1 | 1/2013 | Wang et al. |
| 2013/0166709 A1 | 6/2013 | Doane et al. |
| 2013/0250763 A1 | 9/2013 | Assarpour |
| 2014/0112192 A1 | 4/2014 | Chou et al. |
| 2014/0365622 A1 | 12/2014 | Iyengar et al. |
| 2014/0379823 A1 | 12/2014 | Wilsher et al. |
| 2015/0261670 A1 | 9/2015 | Cheriton |
| 2015/0379100 A1 | 12/2015 | Vermeulen |
| 2016/0085594 A1 | 3/2016 | Wang et al. |
| 2016/0086260 A1 | 3/2016 | Vermeulen et al. |
| 2016/0105534 A1 | 4/2016 | Li et al. |
| 2016/0117186 A1 | 4/2016 | Soundararajan et al. |
| 2016/0142769 A1 | 5/2016 | Spracklen et al. |
| 2016/0212179 A1 | 7/2016 | Kern et al. |
| 2016/0285671 A1 | 9/2016 | Rangarajan et al. |
| 2016/0314211 A1 | 10/2016 | Kerai et al. |
| 2017/0228285 A1 | 8/2017 | Merritt et al. |

OTHER PUBLICATIONS

U.S. Appl. No. 15/195,503 Office Action dated Jan. 26, 2017 consists of 14 pages.
Dugal et al. "Protecting the Router Control Plane" RFC6192, 2011 (Year:2011).
Kreutz et al., "Towards Secure and Dependable Software-Defined Netowrks", 2013 (Year:2013).
Cisco, "Control Plane Protection", 2012 (Year: 2012).
Jones, Operational Security Requirements for Large Internet Service Provider (isp) IP Network Infracstructure:, RFC 3871, 2004 (Year: 2004).
Wikipedia, "Control Plane", 2018 (Year:2018).
Durand et al., "BGP Operations and Security", RFC 7454, 2015 (Year: 2015).

* cited by examiner

NOTIFICATION SERVICE IN A DECENTRALIZED CONTROL PLANE OF A COMPUTING SYSTEM

CROSS-REFERENCE TO RELATED APPLICATIONS

This application claims priority to U.S. Provisional Patent Application Ser. No. 62/355,541, filed Jun. 28, 2016, which is incorporated by reference herein in its entirety.

BACKGROUND

The use of monolithic applications in a computing system, such as a cloud computing system, is gradually being replaced by sets of loosely coupled, independent services. Factoring applications into small services (sometimes referred to as "micro-services") allows those services to have a developmental and operational lifecycle that is independent of their peers. These services typically have a smaller set of responsibilities than their monolithic predecessors, as well as a well-defined application programming interface (API).

The use of such a system of micro-services also comes at a cost: every service may use its own data model, use its own backing store, and define its own interfaces and its own interaction models. As the number of services increases, it becomes difficult to administer the system. For example, different services may use a combination of synchronous and asynchronous APIs, different transports, different serialization formats, their own facilities for authentication and authorization, and so forth. As such, administrators and operators of such systems must possess deep system knowledge to identify runtime issues, and must be informed of the intricacies of every new service added to the system. The proliferation of service technologies also means that users of the system have to use various methods to interact with the system, with varying degrees of observability and extensibility.

SUMMARY

One or more embodiments provide a notification service in a decentralized control plane of a computing system. In an embodiment, a method of providing notifications in a control plane of a computer system includes executing a service host process of the control plane on a software platform of the computer system, the service host process managing services of the control plane and a persistent document store that stores service states for the services; creating a query task service of the control plane, a service state of the query task service including a query filter; evaluating each of the service states against the query filter as each of the service states is added to the persistent document store; updating the service state of the query task service for each of the service states that satisfies the query filter; and sending a notification to a plurality of subscribers of the query task service in response to each update to the service state of the query task service.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Decentralized Control Plane Architecture

Figure 1:
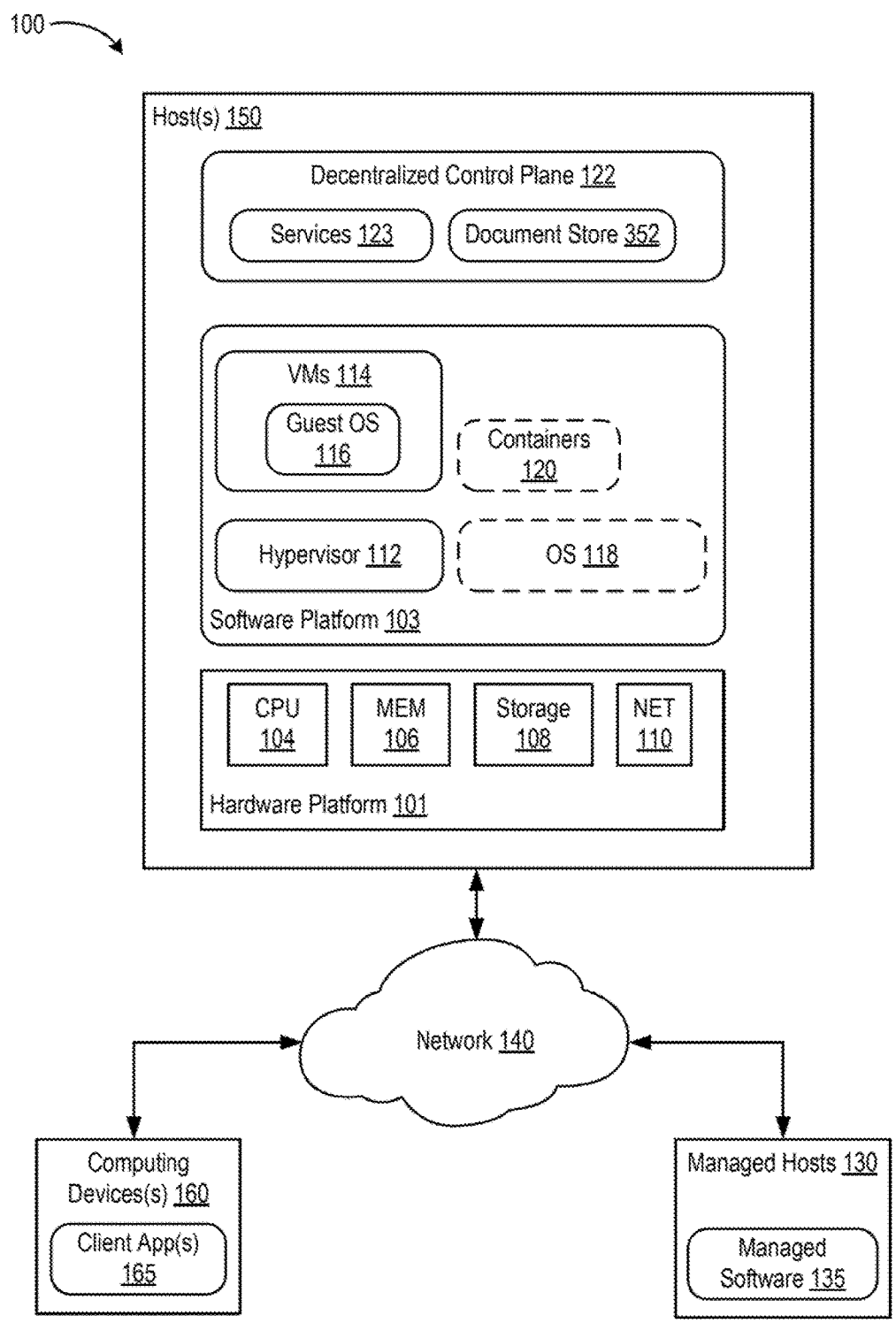
FIG. 1 is a block diagram depicting an embodiment of a computer system supporting execution of decentralized control plane (DCP) software.

FIG. 1 is a block diagram depicting an embodiment of a computer system 100 supporting execution of decentralized control plane (DCP) software (DCP 122). At least a portion of computer system 100 may be part of an on-premise data center controlled and administrated by a particular enterprise or business organization, part of a cloud computing system operated by a cloud computing service provider, or part of a combination of on-premise data center and cloud computing systems. An-premise data center may sometimes be referred to as a "private" cloud; a cloud computing system may be referred to as a "public" cloud; and a combination thereof may be referred to as a "hybrid cloud."

Computer system 100 includes one or more host computers ("host(s) 150"), a network 140, managed hosts 130, and one or more computing devices 160. Network 140 can include various routers, switches, and like network appliances that facilitate communication among hosts 150, between host(s) 150 and computing device(s) 160, and between host(s) 150 and managed hosts 130. Each host 150 is constructed on a hardware platform 101, such as an x86 architecture platform. As shown, hardware platform 101 includes conventional components of a computing device distributed across host(s) 150, such as central processing units ("CPU 104"), system memory ("MEM 106"), storage resources ("storage 108"), and network resources ("NET 110"). CPU 104 is configured to execute instructions, for example, executable instructions that perform one or more operations described herein. Such executable instructions can be stored in MEM 106 and/or in storage 108. MEM 106 includes devices allowing information, such as executable instructions and data, to be stored and retrieved. MEM 110 may include, for example, one or more random access memory (RAM) modules. NET 110 enables host(s) 150 to interface with network 140 and can include network adapters. Storage 108 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Data "stored" in storage 108 encompasses both data stored in the local storage devices and data stored on network data storage systems accessible through the storage interfaces.

Host(s) 150 include a software platform 103 executing on hardware platform 101. In an embodiment, software platform 103 includes a virtualization layer that abstracts processor, memory, storage, and networking resources of hardware platform 101 into multiple virtual machines ("VMs 114") that run concurrently on the same hosts. VMs 120 run on top of the virtualization layer, referred to herein as a hypervisor 112, which enables sharing of the hardware resources by VMs 114. One example of hypervisor 112 that may be used in an embodiment described herein is a VMware ESXi™ hypervisor provided as part of the VMware vSphere® solution made commercially available from VMware, Inc. of Palo Alto, Calif. Hypervisor 112 may run directly on hardware platform 101 or on top of an operating system. Each of VMs 114 executes a guest operating system ("guest OS 116"). Guest OS 116 can be any commodity operating system known in the art.

In another embodiment, software platform 103 includes an operating system ("OS 118") that runs directly on hardware platform 101. OS 118 can be any commodity operating system known in the art. In another embodiment, software platform 103 includes containers 120 executing within OS 118. Containers 118 implement operating system-level virtualization, wherein an abstraction layer is provided on top of the kernel of OS 118. The abstraction layer supports multiple containers each including an application and its dependencies. Containers 118 do not include a guest OS and are sometimes referred to as "OS-less containers." Each container runs as an isolated process in userspace and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and containers. The term "virtualization software" as used herein is mean to encompass both a hypervisor and an operating system kernel supporting containers. Each host 150 can include any embodiment of software platform 103 described above.

Software platform 103 provides an interface between DCP 122 and hardware platform 101. DCP 122 can execute in a single host 150 or can be distributed across multiple hosts 150. For any host 150, DCP 122 can execute within guest OS 116 of one or more VMs 114, within OS 118, or within one or more containers 120 running on OS 118. DCP 122 includes a programmable framework and runtime software that enable building and running of distributed, highly-available, and scaled-out services 123 (also referred to as "microservices"). Services 123 include an external representational state transfer (REST) interface and can be implemented by a set of distributed nodes. DCP 122 includes a document store for backing service state and the runtime provides replication, synchronization, ordering, and consistency for the service state. One example of DCP that may be configured and used as described herein is Project Xenon™ distributed by VMware, Inc. of Palo Alto, Calif.

In an embodiment, DCP 122 manages hosts ("managed hosts 130") and software installed on such hosts ("managed software 135"). Managed hosts 130 can be configured similarly to host(s) 150. Managed software 135 can include hypervisors, VMs, guest OS, containers, OS, and the like (similar to software platform 103), as well as applications. DCP 122 can be used to build an IaaS fabric within managed hosts 130. Services 123 can be used for configuration (desired state), workflows (e.g., finite state machine tasks), grooming, scheduling logic, and the like. IaaS implementation is just one example use of DCP 122. In general, DCP 122 includes services that can be used to manage various aspects of managed hosts 130 and managed software 135.

Computing devices 160 can execute client applications 165 to interact with DCP 122. Computing devices 160 can include computers, laptops, tablets, mobile devices, or the like. Client applications 165 can communicate with services of DCP 122 using their REST interfaces. Client applications 165 can start, pause, resume, and stop services of DCP 122 using REST application programming interface (API) commands, as described further below.

Figure 2:
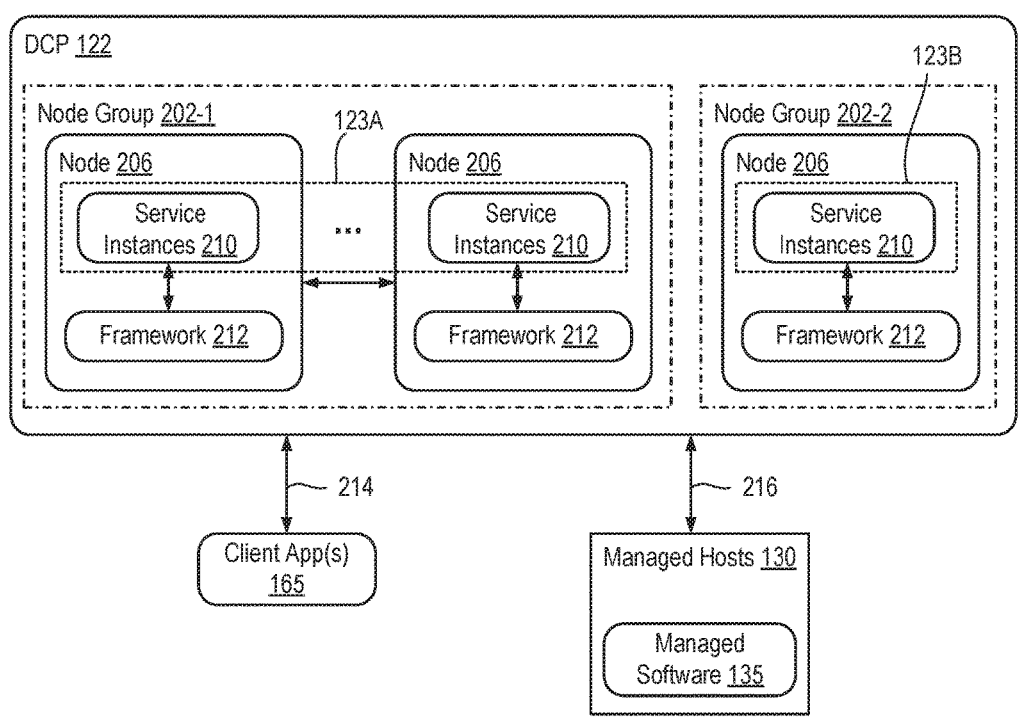
FIG. 2 is a block diagram depicting a DCP according to an embodiment.

FIG. 2 is a block diagram depicting DCP 122 according to an embodiment. DCP 122 includes one or more nodes 206. A "node" is a process, which can execute in various contexts, such as an OS of a host computer, guest OS of a VM, container in an OS, etc. In general, nodes 206 host one or more services 204. Thus, a node is an instance of a "service host process." A node can execute directly on an OS kernel (e.g., compiled C, C++, etc. processes) or within a runtime environment (e.g., Java®, Go™, etc. processes). In various examples described herein, each node 206 is a Java® process with Java® objects, but those skilled in the art will appreciate that the examples can be ported to other programming languages and platforms. Each node 206 is accessed using an Internet Protocol (IP) address and transmission control protocol (TCP) port. A given host environment (e.g., OS, guest OS, container, etc.) can host one or more nodes. In cases where a host environment hosts multiple nodes, each node can be assigned a different IP address and/or TCP port. For example, a service of DCP 122 named Examples can be accessed on a node localhost through port 8000 using a uniform resource indicator (URI) http://localhost:8000/core/examples.

A "service" is a logical object in DCP 122 having a unique URI. An example URI of a service is/core/examples/example1. A service is managed externally through a REST API. Each node 206 hosts one or more service instances 210. A "service instance" is an object within a node that handles requests targeting a service 123 of DCP 122 (referred to as a "service object"). On a given node 206, the URI of a service 123 maps to a service instance 210. For example, if a node 206 is a Java® process, a service instance 210 can be a Java® object instantiated in the Java® process. A "request" is a message including verb mapped to an action of the REST API. In an embodiment, the REST API supports actions mapped to hypertext transfer protocol (HTTP) verbs, such as POST, DELETE, PATCH, PUT, and GET. A "response" is a message including status and potentially results of a request.

A service 123 of DCP 122 is implemented by one or more service instances 210 within one or more nodes. Nodes 206 can be organized in node groups, e.g., node group 202-1 and node group 202-2 (generally node groups 202). Each node group 202 includes one or more nodes 206. In the example, node group 202-1 includes a plurality of nodes 206, whereas node group 202-2 includes a single node 206. Services 123 can be instantiated across a plurality of nodes (i.e., a given service 123 can be implemented using a plurality of service instances 210 across a plurality of nodes 206). In such case, services instances 210 include the same URI at their respective nodes (e.g., /core/examples/example1) and implement a single service 123. Multiple service instances 210 can be implemented on a single node, in which case each service instance includes a unique URI and represents a unique service (e.g., /core/examples/example1 and /core/examples/example2). Unique services can be of the same service type (e.g., /core/examples/example1 and /core/examples/example2 can have an example service type). In the example, services 123A are distributed across nodes 206 in node group 202-1, and services 123B are implemented by node 206 in node group 202-2.

Each node 206 provides a framework 212. Framework 212 provides runtime support for service instances 210. Framework 212 provides a plurality of functionalities, such as replication, synchronization, ordering, and consistency of service state. Framework 212 also maintains a document store for persistent storage of states associated with services 123 that are configured as durable. Framework 212 is described further below with respect to FIG. 3.

Client applications 165 interact with services 123 of DCP 122 using an asynchronous request/response protocol 214. In an embodiment, request/response protocol 214 is HTTP. Services 123 can interact with each other using request/response protocol 214. Services 123 can also interact with themselves using request/response protocol 214 (e.g., a service 123 can update its state using a PATCH verb). Services 123 interact with managed hosts 130 and managed software 135 using interface 216, which can operate using any type of protocol (e.g., remote procedure protocol (RPC), HTTP, etc.) that can be used to communicate with and control managed hosts 130 and managed software 135.

Figure 3:
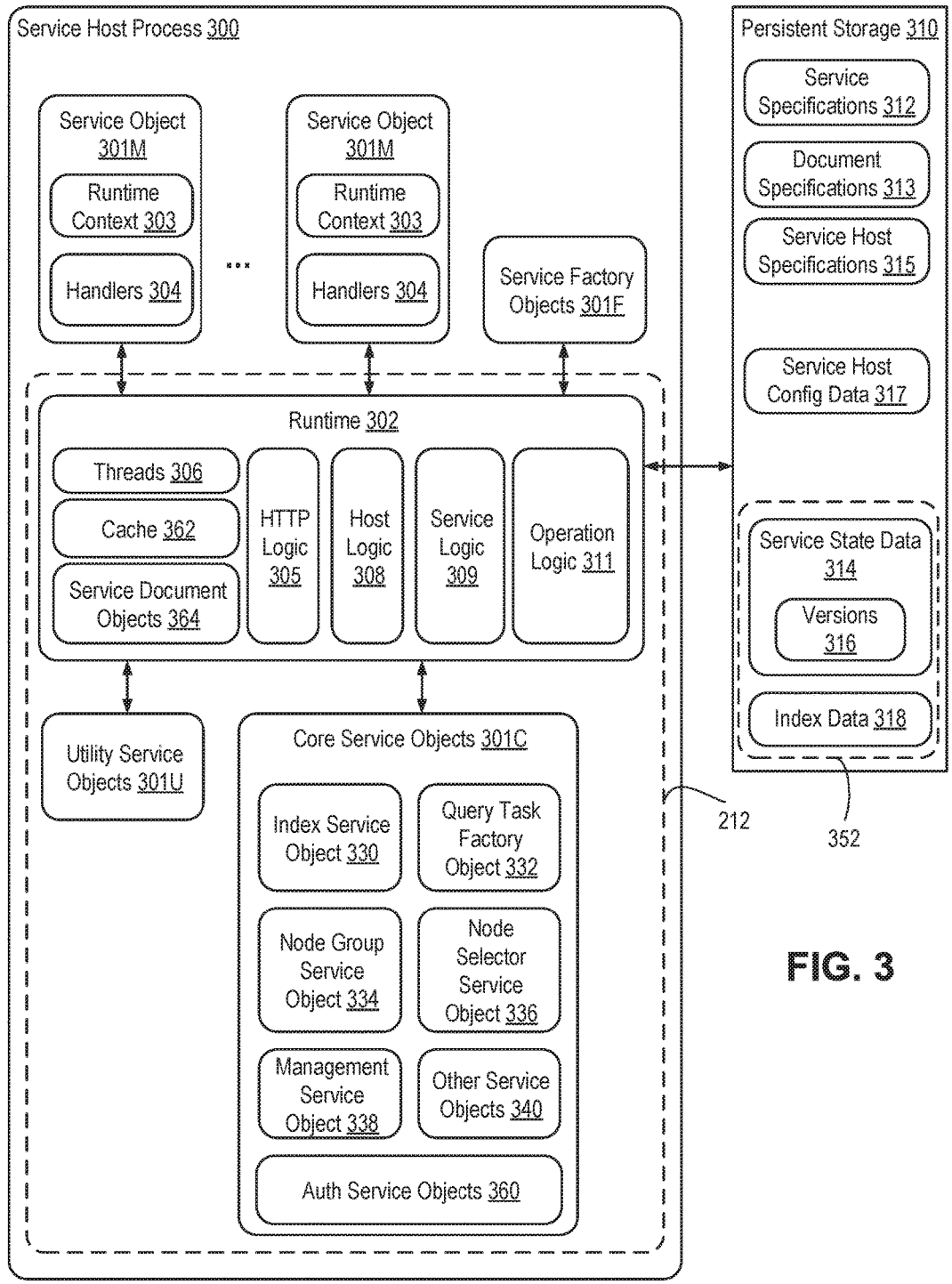
FIG. 3 is a block diagram depicting a service host process of a DCP according to an embodiment.

FIG. 3 is a block diagram depicting a service host process 300 of DCP 122 according to an embodiment. Service host process 300 can be a node 206 of DCP 122 as described above. In the example, service host process 300 includes a plurality of service objects 301M, which are service instances of one or more user-created services. Service host process 300 also includes user-created service factory objects 301F, which can be used to create service objects 301M on request. Service objects 301M and service factory objects 301F are objects created and managed by framework 212.

Framework 212 includes runtime software (referred to as "runtime 302"), utility service objects 301U, and core service objects 301C. Runtime 302 is the code of the service host process executed by CPU 104. Runtime 302 includes HTTP logic 305, host logic 308, service logic 309, and operation logic 311. Runtime 302 also manages a pool of threads 306 within service host process 300. Core service objects 301C are service instances of various framework-supplied services, such as an index service, a query task service, a node group service, a node selector service, a management service, access control services, and various other services. In the embodiment shown, core service objects 301C include an index service object 330, a query task service factory object 332, a node group service object 334, a node selector service object 336, a management service object 338, access control service objects 360, and various other service objects 340, each of which is a service instance for a respective core service. Runtime 302 accesses persistent storage 310, which stores a document store 352, service specifications 312, document specifications 313, service host specifications 315, and service host configuration data 317. Persistent storage 310 is implemented by storage 108. Document store 352 includes a service state data 314 and an index data 318. Service state data 314 can include one or more versions 316 of service states for the services of the control plane.

Services each have a set of capabilities, defined by a plurality of service options. A user can declare the service options for services in service specifications 312. Example service options include PERSISTENCE, REPLICATION, OWNER_SELECTION, and INSTRUMENTATION. The PERSISTENCE service option indicates to runtime 302 that the respective service is durable and should have its state saved in document store 352 (i.e., persistent storage). The REPLICATION service option indicates to runtime 302 that the respective service requires state updates to be replicated among a plurality of nodes. The INSTRUMENTATION service option indicates to runtime 302 that the respective service requires tracking of various statistics. The OWNER_SELECTION service option indicates to runtime 302 that the respective service requires consensus and leader election to be used in the replication protocol. Runtime 302 can be responsive to various other service options.

In general, a user specifies a plurality of service options for services in service specifications 312. In this manner, service specifications 312 define the capabilities of respective services. In an embodiment, classes (e.g., Java® classes) define a service type and service specifications 312 include class definitions for various service types. A portion of an example class definition for a service type in the Java® programming language is shown below:

```
public class ExampleService extends StatefulService {
    public ExampleService( ) {
        super.toggleOption(ServiceOption.PERSISTANCE, true);
        super.toggleOption(ServiceOption.REPLICATION, true);
        super.toggleOption(ServiceOption.INSTRUMENTATION,
            true);
        super.toggleOption(ServiceOption.OWNER_SELECTION,
            true);
    }
    ...
}
```

In the example, a service type named "ExampleService" is declared that extends a base class "StatefulService." The functions of the StatefulService class can be implemented by service logic 309, which is described further below. ExampleService includes a public constructor "ExampleService ( )" that makes several calls to a function "toggleOption" of the StatefulService base class for setting service options. The service options are declared as part of an enumeration "ServiceOption." An instance of a service of type ExampleService is a service object generated by creating an instance of the ExampleService class. The above example illustrates one example technique for declaring service options for a service. Other techniques can be employed using the Java® language or other programming languages.

Document specifications 313 specify the specific structure of documents that represent states of services ("service documents"). The terms "service state" and "service document" are used interchangeably herein. A "service document instance" is an object within service host process 300 that stores a service document (referred to as a "service document object" or "service state object"). A service document object is a plain old data object (PODO) (no methods) that includes various fields. A version of the service state for a service is determined by the values of the fields of the service document object. In an embodiment, classes (e.g., Java® classes) define a type of service document and document specifications 312 include class definitions for service document types.

Figure 6:
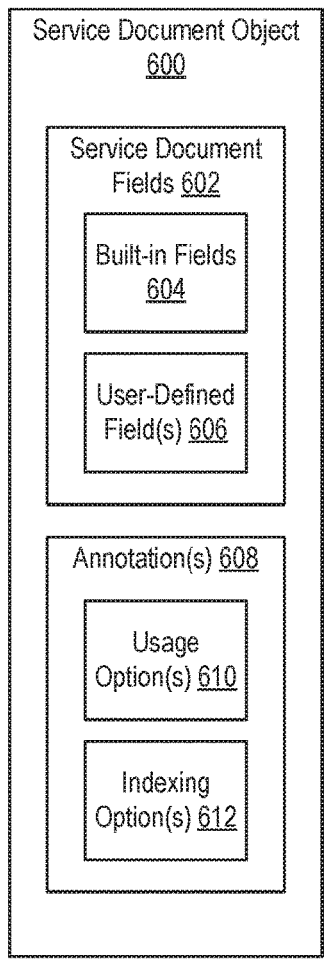
FIG. 6 is a block diagram depicting structure of a service document object according to an embodiment.

FIG. 6 is a block diagram depicting structure of a service document object 600 according to an embodiment. Service document object 600 includes service document fields 602 and optionally one or more annotations 608 to the service document fields 602. Service document fields 602 (also referred to as service document object fields) store values that form the service state. Service document fields 602 can include various data types, such as integers, strings, bytes, collections, maps, Booleans, floating point numbers, dates, URIs, enumerations, tuples, PODOs, and the like. A value stored by each service document field 602 can be a single value (e.g., an integer value, string value, etc.) or multiple values (e.g., a collection of values, map of key/value pairs, etc.). A service document field 602 can include one or more annotations 608. Annotations 608 provide meta-data for one or more service document fields 602.

In an embodiment, annotations 608 include usage options(s) 610 and indexing option(s) 612. Usage option(s) 610 can include one or more annotations related to how a service document field is used, such as single-assignment (i.e., indicates the field is immutable), optional (indicates that the field may or may not have a value), service-use (indicates that the field is only for use by the service and not visible to the client), infrastructure-use (indicates that the field is only for use by the runtime and not visible to the service instances or clients), link (indicates that the field is a link to another document), and the like. Indexing option(s) 612 include one or more annotations related to how a service document field should be processed when the service document is parsed for indexing and storage. Indexing option(s) 612 can include expand (indicates that a multi-value field, such as a PODOs, should have all its fields indexed and stored), store-only (indicates that the field should not be indexed, but only stored), text (indicates that the field should be indexed and stored as text), sort (indicates that the field should be indexed in a manner that enables sorting), and the like.

Service document fields 602 can include built-in fields 604 and user-defined field(s) 606. Built-in fields 604 are used by framework 212 (e.g., part of a ServiceDocument base class). Built-in fields include various fields, such as a document kind field, a self-link field (e.g., to hold a URI of the corresponding service), an authorized principal link field (e.g., to hold a URI of a user who owns the document), a document description field, document update time field, document version field, document epoch field, and the like. User-defined field(s) 606 include one or more fields defined by a user for storing service state of a user-defined service.

Returning to FIG. 3, an example class definition of a document type implemented in Java® is shown below:

```
public class ExampleService extends StatefulService {
    public static class ExampleServiceState extends
            ServiceDocument {
        public static final String FIELD_NAME_KEY_VALUES =
            "keyValues";
        public Map<String, String> keyValues = new
            HashMap<>( );
        public Long counter;
        @UsageOption(option =
            PropertyUsageOption.AUTO_MERGE_IF_NOT_NULL)
        Public String name;
    }
    ...
}
```

In the example, the ExampleService class includes a nested class "ExampleServiceState" that extends a "ServiceDocument" base class. The ExampleServiceState class includes fields "keyValues," "counter," and "name." The keyValues field is a multi-valued field having a Map<string, string> type, the counter field is a single-valued field having an integer type, and the name field is a single-valued field having a string type. The name field includes a usage option annotation AUTO_MERGE_IF_NOT_NULL, which indicates that the field is updated if its value is not null during an update operation. The above example illustrates one example technique for declaring structure of a service document. Other techniques can be employed using the Java® language or other programming languages.

Runtime 302 creates service document objects 364 to store service states for use by handlers 304 of service instances 210. Each handler 304 comprises a software function configured to process a particular type of request. Each service document object 364 stores a version of service state. Service document objects 364 are stored in memory 106 of host computer 150 (e.g., in-memory service state). Service document objects 364 can be created and destroyed as handers 304 and other functions are invoked and completed. In some embodiments, runtime 302 can maintain a cache 362 for temporarily storing service document objects 364 longer than a single function or handler 304 call. Cache 362 is stored in memory 106 of host computer 150. For a durable service, its service document is stored persistently in document store 352. For a non-durable service, its service document is only stored for as long as a respective service document object is stored in memory (e.g., held in cache 362). In an embodiment, document store 352 is log-append structured storage. To save a service document, framework 212 appends the service document to service state data 314 in document store 352. If a service document is saved multiple times, then document store 352 will include multiple versions 316 of the service document. When a service document is saved, framework 212 can index at least a portion of the service document by adding to index data 318.

Each service factory object 301F is an instance of a service factory. A "service factory" is a service used to create child services. Each service factory object 301F is used to create child service objects (e.g., service objects 301M) during runtime. In an embodiment, service factory objects 301F are singletons (e.g., only one service factory object per service factory in a given service host process) and are not durable. Each service factory object 301F can include handlers for POST and GET verbs of the REST API. The handler for the POST verb creates a service object. The handler for the GET verb provides a list of created service objects and their state. An example class definition and instantiation of a service factory for a service implemented in Java® is shown below:

```
public class ExampleService extends StatefulService {
    public static FactoryService createFactory( ) {
        return FactoryService.createIdempotent
            (ExampleService.class,
```

-continued

```
            ExampleServiceState.class);
    }
    ...
}
...
public class DecentralizedControlPlaneHost extends ServiceHost {
    public ServiceHost start( ) {
        // Start the example service factory
        super.startFactory(ExampleService.class,
                ExampleService::createFactory) ;
        ...
        ...
    }
    ...
}
```

In the example, the ExampleService class includes a class function "createFactory ( )" that is used to create an instance of FactoryService. The createFactory ( ) function calls a class function "createIdempotent" of a base class "FactoryService" to create the service object. A singleton instance of FactoryService is started on host start with a "start ( )" function of "DecentralizedControlPlaneHost" that extends a "ServiceHost" base class. The functions of the ServiceHost base class can be implemented by host logic 308, which is described further below.

Host logic 308 is configured to manage service lifecycle and handle delivery of operations to services (remote and local). Host logic 308 maintains a runtime context that includes various information, such as IP address, TCP port number, node ID, and the like. At least a portion of the runtime context of host logic 308 can be saved in service host configuration data 317. Host logic 308 includes various methods for initialization of runtime 302, as well as starting, stopping, pausing, resuming, etc. of core services, service factories, utility services, and user-created services. Host logic 308 can also include methods for applying authorization policies, loading service state from and saving service state to document store 352, caching service state, queuing and forwarding requests to service objects, and performing maintenance on services. Host logic 308 also schedules service handlers to use threads 306 when the service handlers are invoked. As described in the example above, a user can extend host logic 308 to include various customizations (e.g., custom start methods).

Service logic 309 is configured to implement base functionality for services. For example, service logic 309 can implement the functions of the StatefulService base class described in the examples above. Service logic 309 includes functions for queueing requests, checking service state, handling requests, loading and linking service state, validating updates to service state, handling REST API verbs, handling request completions, handling replication, and handling synchronization. For some functions, service logic 309 can cooperate with functions of host logic 308.

Operation logic 311 is configured to implement functionality for encapsulating the request/response pattern of client to service and service-to-service asynchronous communication. Operation logic 311 includes functions for creating operation objects and associating the operation objects with a response/request message, and associating the operation objects with service state objects. Operation logic 311 also includes functions for indicating whether an operation object is from replication, synchronization, or notification, and whether the operation object includes proposed state or committed state.

Figure 7:
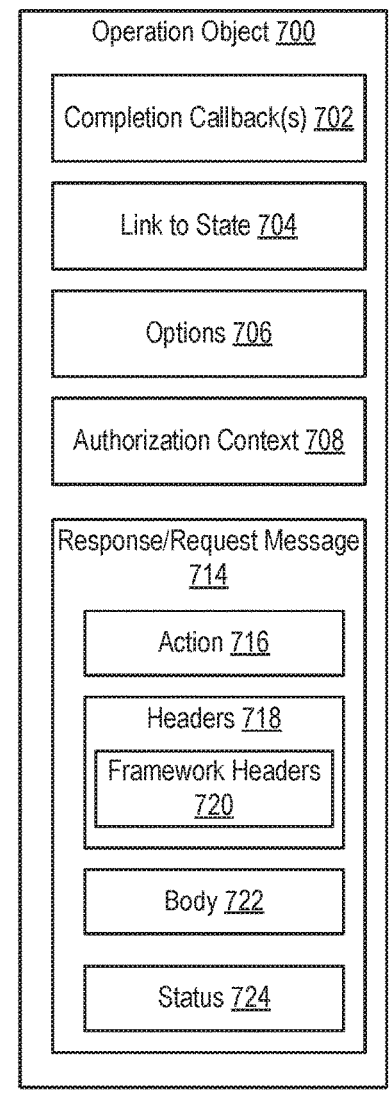
FIG. 7 is a block diagram depicting an operation object according to an embodiment.

FIG. 7 is a block diagram depicting an operation object 700 according to an embodiment. Operation object 700 includes one or more completion callbacks 702, a link to state 704, options 706, an authorization context 708, and response/request message 714. Completion callback(s) 702 points to procedure(s) to be called in response to completion of operation 700. Link to state 704 is a reference to a service document object in memory. Options 706 can include various options, such as a replication option to indicate that the operation object is part of the replication protocol, a forwarding option to indicate that the operation object has been forwarded from another node, a notification option to indicate that the operation object is part of the notification protocol, and the like. Authorization context 708 includes information that can be used to authorize a request. Response/request message 714 can include an action 716, headers 718, a body 722, and status 724 depending on the type of message. Action 716 indicates an HTTP verb. Headers 718 can include various HTTP headers. In addition, headers 718 can include framework headers 720. Framework headers 720 include proprietary headers used by framework 212. Body 722 includes the body of a request or response message. Status 724 includes a status code for a response message. For actions that perform updates to service state (e.g., PUT or PATCH), body 722 includes the update data.

Returning to FIG. 3, each service object 301M includes a runtime context 303 and handers 304. Runtime context 304 can store various information for service object 301M, such as a current processing stage of the service object (e.g., created, available, stopped, etc.), the current version of service state, the current epoch for replication, and the like. Runtime context 304 is the portion of a service object 301M that is stored in memory. Handlers 304 can include functions invoked by runtime 302 when services are created, started, paused, resumed, and stopped. Handlers 304 can include functions invoked by runtime 302 for verbs of the REST API (e.g., GET, PUT, PATCH, DELETE, POST). Handlers 304 can extend or replace functionality of service logic 309. Handlers 304 can supply required functionality not present in service logic 309 (e.g., PUT and PATCH handlers). A user can specify handlers 304 as part of service specifications 312 (e.g., methods in a class definition). When a handler 304 is invoked, host logic 308 allocates a thread 306 to the handler.

An example definition of a PUT handler for a service implemented in Java® is shown below:

```
public class ExampleService extends StatefulService {
    public void handlePut(Operation put) {
        ExampleServiceState newState = getBody(put);
        ExampleServiceState currentState = super.getState(put);
        // example of structural validation
            If (currentState.name != null && newState.name == null) {
                put.fail(new IllegalArgumentException("name must be
                    set"));
                return;
            }
        updateCounter newState, currentState, false);
        // replace current state with the body of the request
        super.setState(put, newState);
        put.complete( );
    }
    ...
}
```

In the example, the class ExampleService includes a handler "handlePut ( )" for handling PUT requests. The handlePut ( ) function receives an "Operation" parameter put that references an operation object encapsulating the request. The handlePut ( ) function first gets newState from the body of the request using a function getBody ( ) and currentState of the service using a function getState ( ) of the superclass. The handlePut ( ) function then validates newState and calls the fail ( )method of put if invalid. The handlePut ( ) function then calls a private function updateCounter ( ) to update the counter field of the service state. The handlePut ( ) function then replaces the current state with the state in the body of the request using the function setState ( ) of the superclass. Finally, the handlePut ( ) function invokes the complete ( ) function of put. Other techniques can be employed using the Java® language or other programming languages for implementing a handler.

Clients access framework 212 and services using the REST API. HTTP logic 305 manages REST API transactions with clients. In an embodiment, the REST API includes HTTP actions POST, DELETE, PATCH, PUT, and GET. Sending POST to a service factory creates an instance of a service (i.e., a service object 301M). Sending POST to a service can be used to compute work or add new resources on a service. Sending DELETE to a service stops the service and creates a new empty state. Sending PATCH to a service can be used to update at least a portion of service state. Sending PUT to a service can be used to replace service state in its entirety. Sending GET to a service can be used to retrieve the state of the service. Sending GET to a service can lead to several asynchronous operations to other services to collect their states, which the service then composes on the fly and returns as its state.

In an embodiment, runtime 302 (e.g., host logic 308) starts one or more utility service objects 301U for each service object. Utility service objects 301U are instances of various utility services, such as a subscription service, statistic service, user interface (UI) service, configuration service, template service, and availability service. The subscription service can be used to provide a list of subscribers to a service. A service notifies its subscribers in response to state changes. The statistics service can be used to report various runtime statistics associated with services. The UI service can be used to render a UI on a client for accessing a service. The configuration service can be used to change service options or other configuration data during runtime. The template service can be used to provide a default state for a service. The availability service can be used to determine if a service is ready to accept requests. These are just some examples of utility services that can be instantiated by runtime 302 per service. In an embodiment, the utility services (e.g., subscription, statistics, UI, configuration, template utility services) can be implemented on service host process 300 using a single utility object 301U.

Runtime 302 (e.g., host logic 308) also creates core service objects 301C. Core service objects 301C are instances of various core services. The index service manages document store 352. Index service object 330 handles requests on behalf of runtime 302 and service objects 301M for storing and retrieving service documents at service host process 200. Index service object 330 also manages versioning and indexing of service documents at service host process 200.

Query task factory service creates query task services upon request. Remote clients or local clients (e.g., service objects 301M) can send requests to query task factory service, which are handled on service host process 300 by query task factory service object 332, to create query task services. Query task services cooperate with the index service to perform various queries to obtain service state information.

Node group service tracks node membership across node groups. Node group service employs a scalable gossip layer to manage node group membership. In an embodiment, node selector service selects owner nodes within a given node group using a consistent hashing algorithm. Runtime 302 can use node group service object 334 to forward requests to owner nodes for services that implement replication with consensus as described herein. Runtime 302 can use node selector service object to determine owner nodes. Management service provides a REST front end for changing various configuration data, such as TCP port, maintenance intervals, etc. Access control services control user access to services. When authentication and authorization are enabled, all requests to a service are subject to two additional checks: (1) Is the request on behalf of a valid user? (2) Is that user authorized to perform the desired action of the service? Any unauthorized access will result in a "forbidden" response from framework 212. Core service objects 301C can include various other service objects 340, such as instances of DNS services, log services, JavaScript services, and the like.

Framework 212 is configured to support clustering, that is, the ability to group together a set of nodes for the purposes of scale-out, high-availability, and unified management. Framework 212 manages node group membership (e.g., using node group service), balancing and forwarding of requests, replication, and synchronization. As discussed above in FIG. 2, a node group includes a plurality of nodes. A given node can belong to multiple node groups. A service belongs to a single node group. Node group service manages group membership using a gossip protocol. In general, a new node joins the node group through an existing member. Each node in the node group sends its view of membership to peer nodes in the node group during maintenance intervals (e.g., using a PATCH request handled by node group service object 334). Nodes can update their view of membership based the membership views received from peers.

Framework 212 implements balancing and forwarding of requests (e.g., using host logic 308 and node selector service). A request can enter through any node in the node group. If a service includes an owner (e.g., configured using the OWNER_SELECTION service option), framework 212 forwards requests targeting the service to its owner node. Node selector service employs a consistent hashing algorithm to designate an owner node for a given service per request. As a result, ownership per service is fixed as long as node group membership is stable. As nodes are added and removed from the node group, ownership per service can change. Framework 212 increments a replication epoch for a service in response to ownership changes. The consistent hashing algorithm ensures that ownership across services is evenly spread across group members.

Framework 212 implements replication across nodes in a node group (e.g., using service logic 309, host logic 208, and node selector service 336). Service state can be updated by a service instance at an owner node. In response, the owner node increments state version and replicates the updated state to peer nodes in the node group. Framework 212 can be configured to replicate updated state to all group members or only a portion of the group. If replication fails, then the request that triggered the state update fails and synchronization is triggered. If replication is successful, the updated state is persisted at the owner node. Framework 212 employs a consensus algorithm to determine whether replication is successful.

Framework 212 implements synchronization (e.g., using service logic 309 and host logic 308). Synchronization can be triggered on demand, periodically, or in response to replication failure. During synchronization, framework 212 selects an owner for a service. The owner node broadcasts a request to its peer nodes to obtain their latest state for the service. Framework 212 on the owner node chooses the best state based on replication epoch and version. The owner node then sends the selected best state for the service to the peer nodes in the node group.

In the embodiment of FIG. 3, each of runtime 302, core service objects 301C, and utility service instances 301U are described has performing specific functionalities of framework 212. Although specific examples are described where a given component performs a given function, any functionality of framework 212 described herein can be performed by runtime 302, core service objects 301C, utility service objects 301U, or a combination thereof. Moreover, although runtime 302 is described as having a specific component structure, the functionalities of runtime 302 can be performed by any of one or more logic components, including HTTP logic 305, host logic 308, service logic 309, and operation logic 311, or any other component.

In various embodiments, a component in framework 212 is described as "obtaining state" of a particular service. Service state can be obtained using various techniques, each of which ultimately results in either the state being obtained from cache 362 or service state data 314 in document store 352. In an embodiment, a client or service can obtain state by sending a request with the GET verb to the service. In such case, the service takes care of obtaining state from cache 362 or using the index service. Alternatively, a client or service can directly send a request with the POST verb to the index service to obtain service state.

In various embodiments, a component in framework 212 is described as "forwarding a request" to a target service or "sending a request" to a target service. To perform some work for a request, a client or service can send the request with the POST verb to the target service. To get service state, a client or service can send the request with the GET verb as described above. To modify service state, a client or service can send the request with the PATCH verb. To replace service state, a client or service can send the request with a PUT verb.

Figure 4:
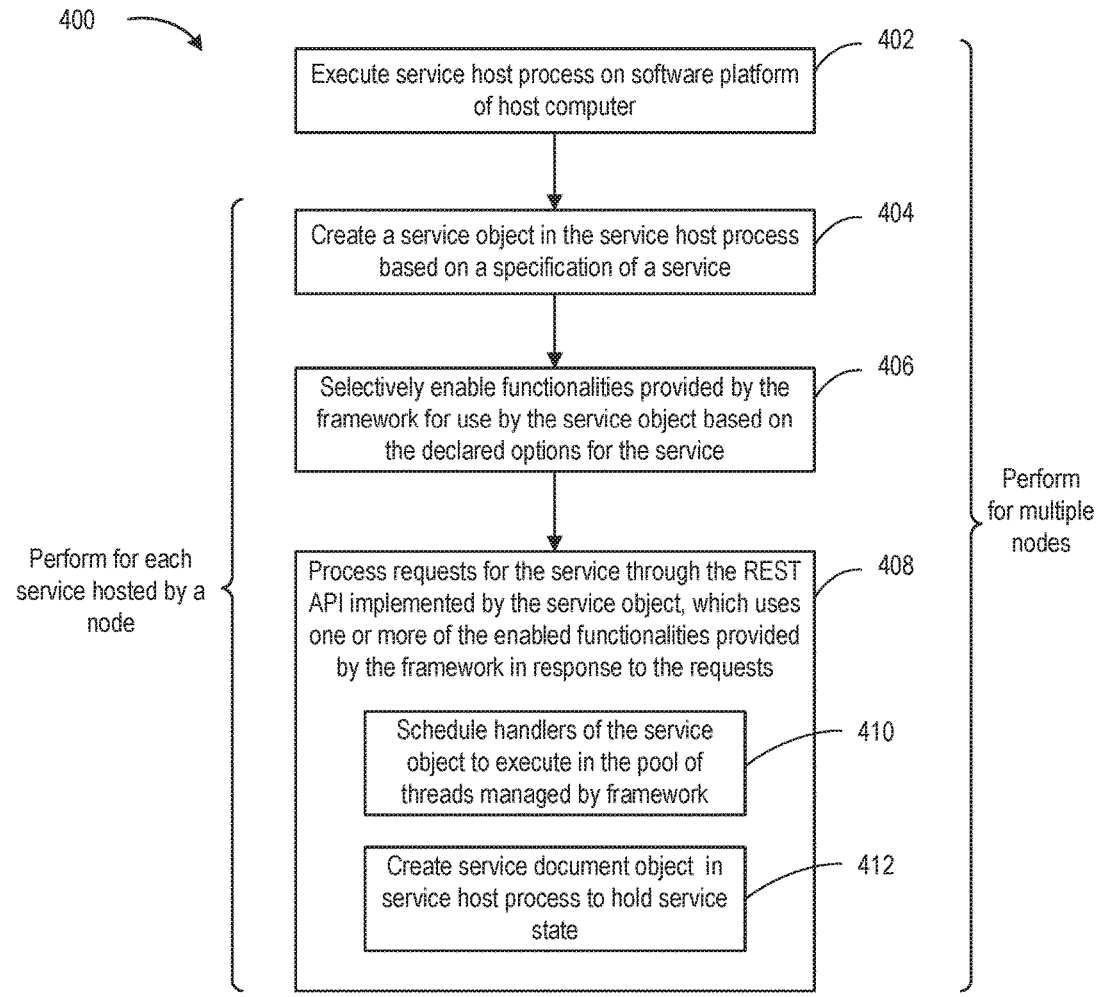
FIG. 4 is a flow diagram depicting a method of implementing a control plane for services in a computer system according to an embodiment.

FIG. 4 is a flow diagram depicting a method 400 of implementing a control plane for services in a computer system according to an embodiment. Method 400 can be used to implement DCP 122 in computer system 100. Method 400 begins at step 402, where an administrator executes a service host process 300 (e.g., node 206) on software platform 103 of a host computer 150. As discussed above, service host process 300 includes framework 212 that provides a plurality of functionalities. Example functionalities include synchronization, replication, persistence, consensus and leader election, and the like.

At step 404, runtime 302 in framework 212 creates a service object 301 in service host process 300 based on a specification of a service (e.g., service specifications 312). Service object 301 includes a REST API. The REST API supports a plurality of verbs (e.g., HTTP PUT, PATCH, GET, DELETE, POST, etc.). Service specifications 312 define declared options for the service. The declared options are used to define the capabilities of the service. For example, a declared option PERSISTENCE makes the service durable; a declared option REPLICATION makes the service a replicated service; a declared option OWNER_SELECTION adds consensus and leader election to the replication protocol, etc.

At step 406, runtime 302 selectively enables functionalities for use by service object 301 based on the declared options for the service. At step 408, runtime 302 processes requests for the service through the REST API implemented by service object 301, which uses one or more of the enabled functionalities provided by runtime 302 in response to the requests. Requests can originate from client applications 165, from remote services (services in another node), or from local services (services in this node). Request processing can vary depending on the enabled functionalities. For example, if the REPLICATION option is declared, requests that update service state are replicated across peer nodes. If the PERSISTENCE option is declared, updated state is stored as a new version of state in document store 352. Service object 301 uses enabled functionalities provided by runtime 302 through asynchronous operations. Thus, all service interactions take place through asynchronous message passing.

Step 408 includes a step 410, where runtime 302 schedules handlers 304 for service object 301 to execute in a pool of threads 306 managed by runtime 302. Thus, a single pool of threads is used across all services in the same service host process (node). Service handlers run in any available thread and do not share a call stack with other services. A handler can inherit functionality from runtime 302 (e.g., default handlers in service logic 309). A handler can instead include a functionality specified in the specification for the service (e.g., handlers that override the default handlers in service logic 309). A handler can both inherit functionality from runtime 302 and include custom functionality. Step 408 can include a step 412, where runtime 302 creates a service document object 364 to hold service state for use by handlers 304 of service object 301. Service document object 364 is created based on a specification of a service document (e.g., in service specifications 312).

Steps 404-412 can be performed for each service hosted by the node. Method 400 can be performed for multiple nodes of DCP 122. Multiple nodes can execute on a single host and/or across multiple hosts.

Figure 5:
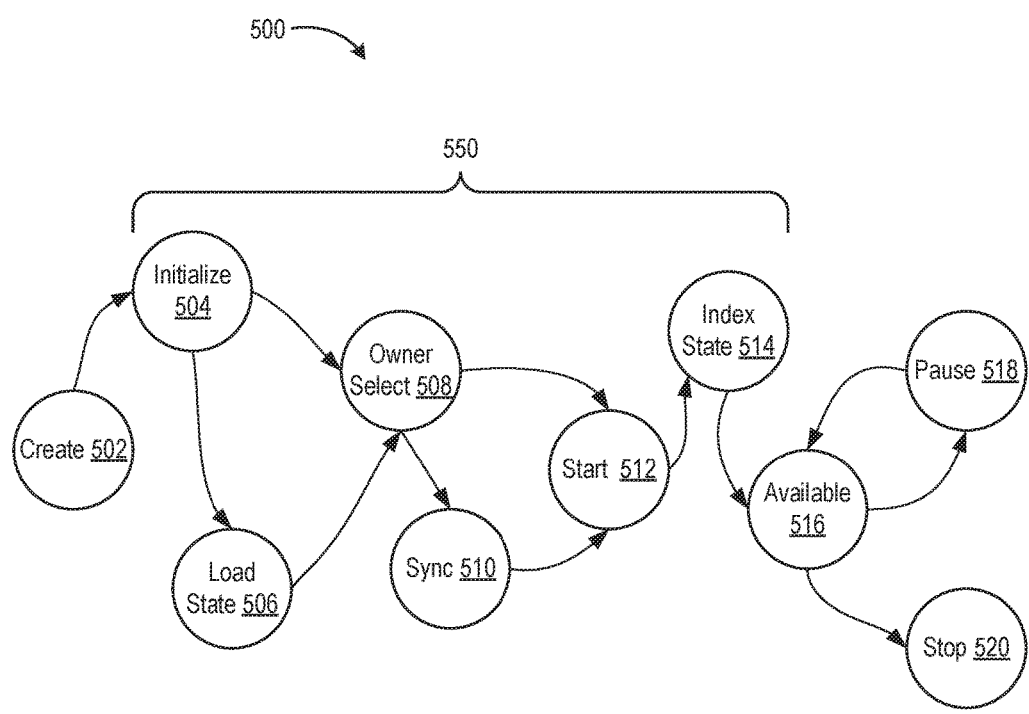
FIG. 5 is a state diagram showing service object lifecycle according to an embodiment.

FIG. 5 is a state diagram showing service object lifecycle 500 according to an embodiment. Services objects 301 transition through a plurality of processing stages of service object lifecycle 500. Service object lifecycle 500 begins at a create stage 502, where a service object is instantiated (e.g., using a service factory object or directly by the service host process) and is attached to the service host process. The service host process maintains a list of all attached service objects. Runtime 302 also generates a request to start the service, which is provided as input to a service start state machine that controls the startup portion 550 of service object lifecycle 500. Startup portion 550 is between create stage 502 and available stage 516.

After creation, service object lifecycle 500 proceeds to initialization stage 504, where runtime 302 initializes an operation object that encapsulates the startup request. For example, runtime 302 can initialize an authorization context for the startup request. Runtime 302 also determines whether the service being started is indexed and, if so, selects a load state stage 506 as the next stage. If the service being started is not indexed, runtime 302 selects an owner selection stage 508 as the next stage.

After initialization, service object lifecycle 500 can transition to load state stage 506 (i.e., if the service is indexed). During the load state stage 506, runtime 302 loads the most recent service document of the service into memory and links it to the startup request. If there is an initial service state provided in the request to create the service, the initial service state is used as the most recent service document.

From either initialization stage 504 or load state stage 506, service object lifecycle 500 transitions to owner selection stage 508. At owner selection stage 508, runtime 302 determines whether the service being started is replicated (i.e., the REPLICATION service option is set). If not, runtime 302 transitions directly to a start stage 512. If the service being started is replicated, runtime 302 assigns a node ID of the owner node for the service to the service object and sets the next stage as a synchronization stage 510.

During synchronization stage 510, the service object synchronizes service state with other service objects for the service on peer nodes. From either owner selection stage 508 or synchronization stage 510, service object lifecycle 500 transitions to start stage 512. At start stage 512, the service object becomes visible to clients, processes any self-requests, and queues external requests. Runtime 302 calls a creation handler, start hander, or both of the service object during start stage 512.

From start stage 512, service object lifecycle 500 transitions to index state stage 514, where runtime 302 requests index service to index and store the service document object linked to the service object. From index state stage 514, service object lifecycle 500 transitions to available stage 516. At available stage 516, the service object de-queues and processes requests.

From available stage 516, service object lifecycle 500 can transition to pause stage 518. In pause stage 518, the service is paused (e.g., runtime 302 can pause a service in response to memory pressure). Service object lifecycle 500 can transition back to available stage 516 from pause stage 518 (e.g., runtime 302 can resume a paused service in response to a request targeting the service). From available stage 516, service object lifecycle 500 can transition to a stop stage 520. At stop stage 520, runtime 302 reclaims resources used by the service object. Runtime 302 calls a stop handler of the service object during stop stage 520 and removes the service object from the attached service list of the service host process.

Decentralized Control Plane Notification Using Query Task Service

In an embodiment, some services of DCP 122 are task services. A task service can be used to perform a long-running task on behalf of a client. In general, the workflow for a task service includes: 1) A client sends a POST request to a task factory service to create the task. The POST request includes all parameters needed to describe the task; 2) The task factory service creates a task service to manage the task; and 3) The task service executes a series of steps to perform the task. The task service can: 1) take some action; 2) when the action completes, update its service state by sending a PATCH request to itself; and 3) when the PATCH request is processed, the task service takes the next action or ends.

In an embodiment, DCP 122 includes a query task service factory that creates query task services. As described below, a user can use a query task service to implement notification. In general, a query task service manages a query task that executes rich queries against service documents. The behavior of a query task is driven by a query specification defined by a user and a set of options that govern the result set. In an embodiment, one option is a CONTINUOUS option that creates a long running query filter used to process all service documents added to document store 352. For a continuous query task, the query specification is compiled into an efficient query filter that evaluates each service document added to document store 352. If the filter evaluates to true, the service document or a portion thereof is sent to the query task service using a PATCH request to update the service state of the query task service. Subscribers of the query task service receive a notification of the query task state update after processing of the PATCH request. In this manner, the continuous query task acts as a node-wide black board, or notification service, which allows clients to receive notifications of service state updates without having to subscribe to potentially millions of discrete services.

Figure 8:
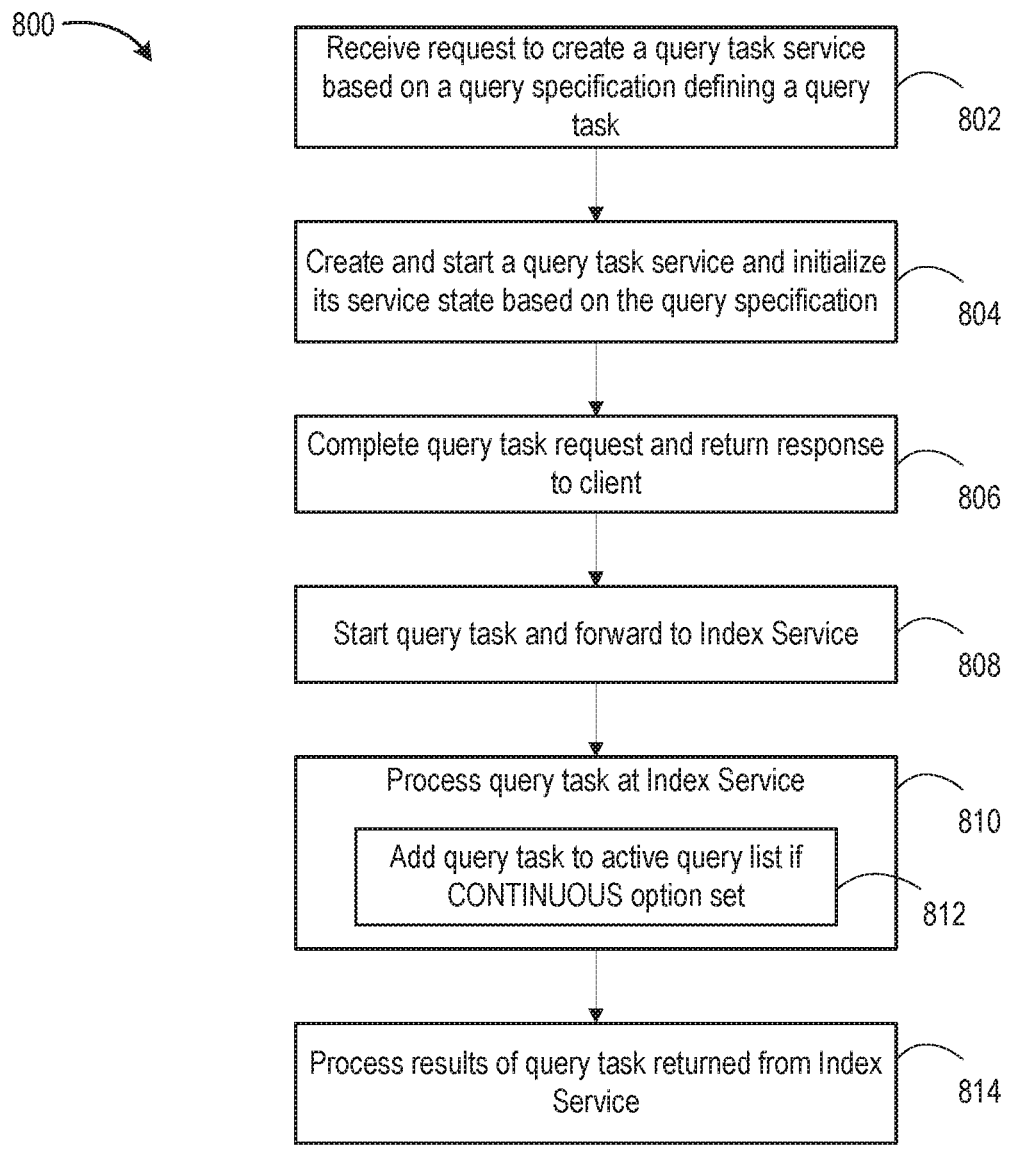
FIG. 8 is a flow diagram depicting a method of creating a query task service.
Figure 9:
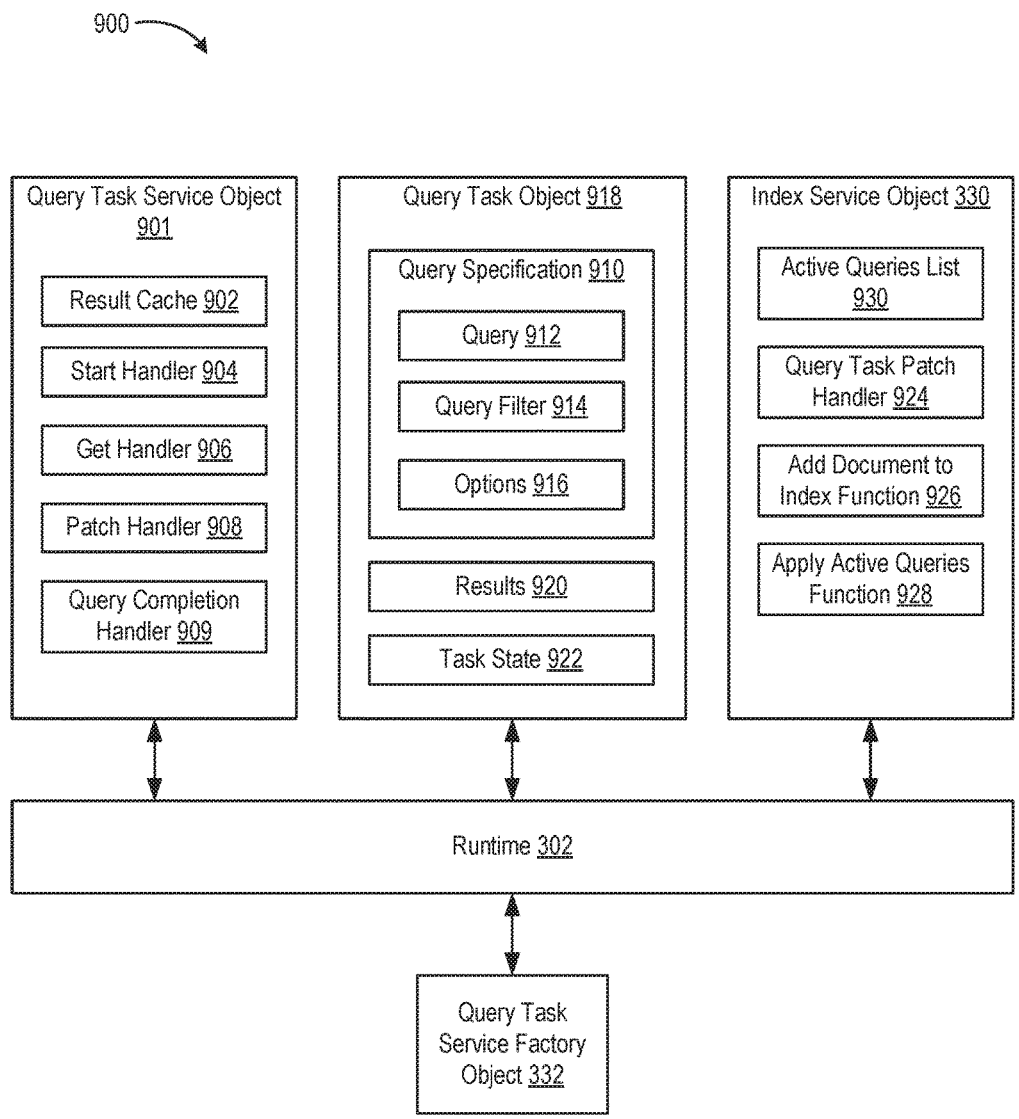
FIG. 9 is a block diagram a portion of a service host process according to an embodiment.
Figure 10:
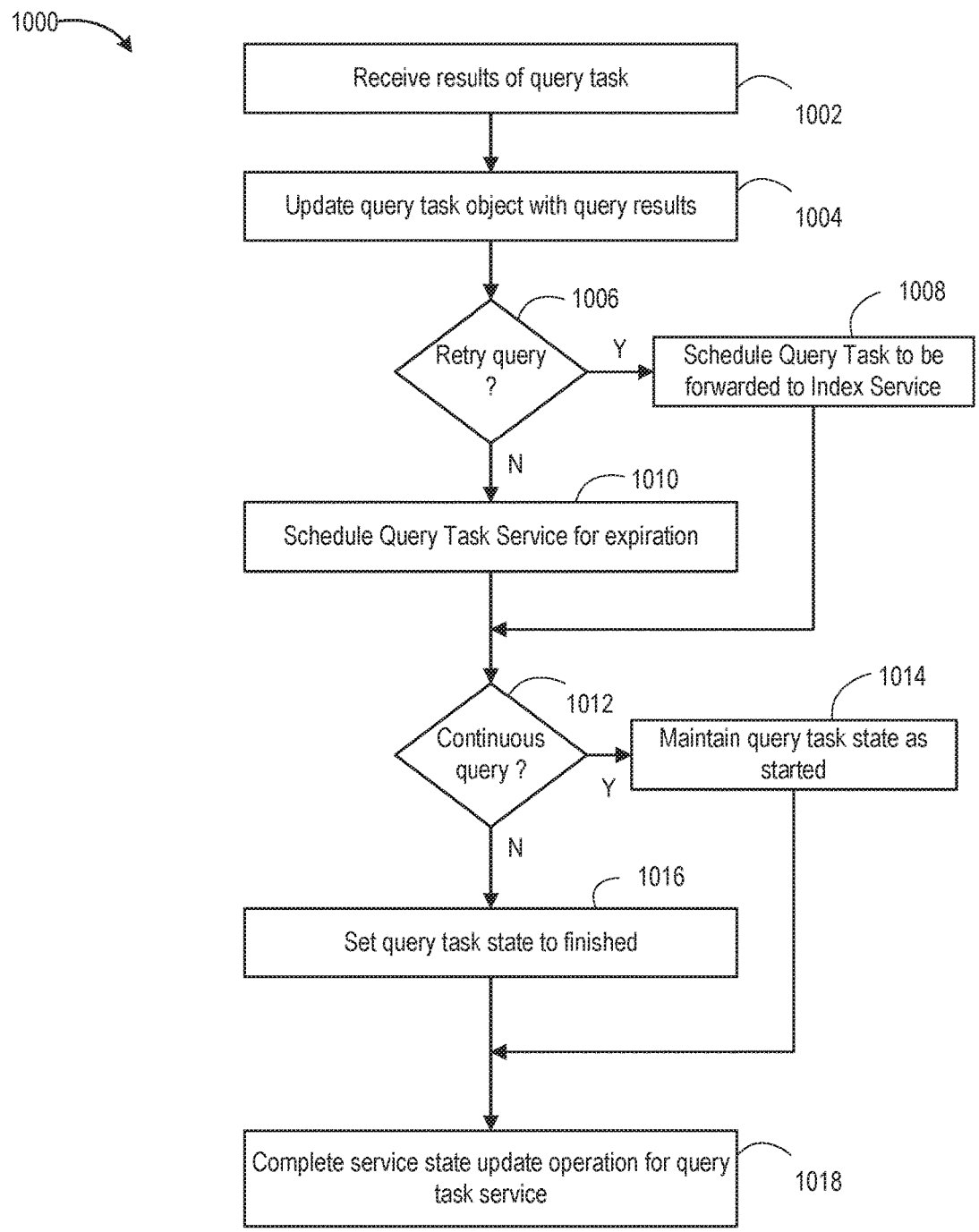
FIG. 10 is a flow diagram depicting a method of processing query results according to an embodiment.
Figure 11:
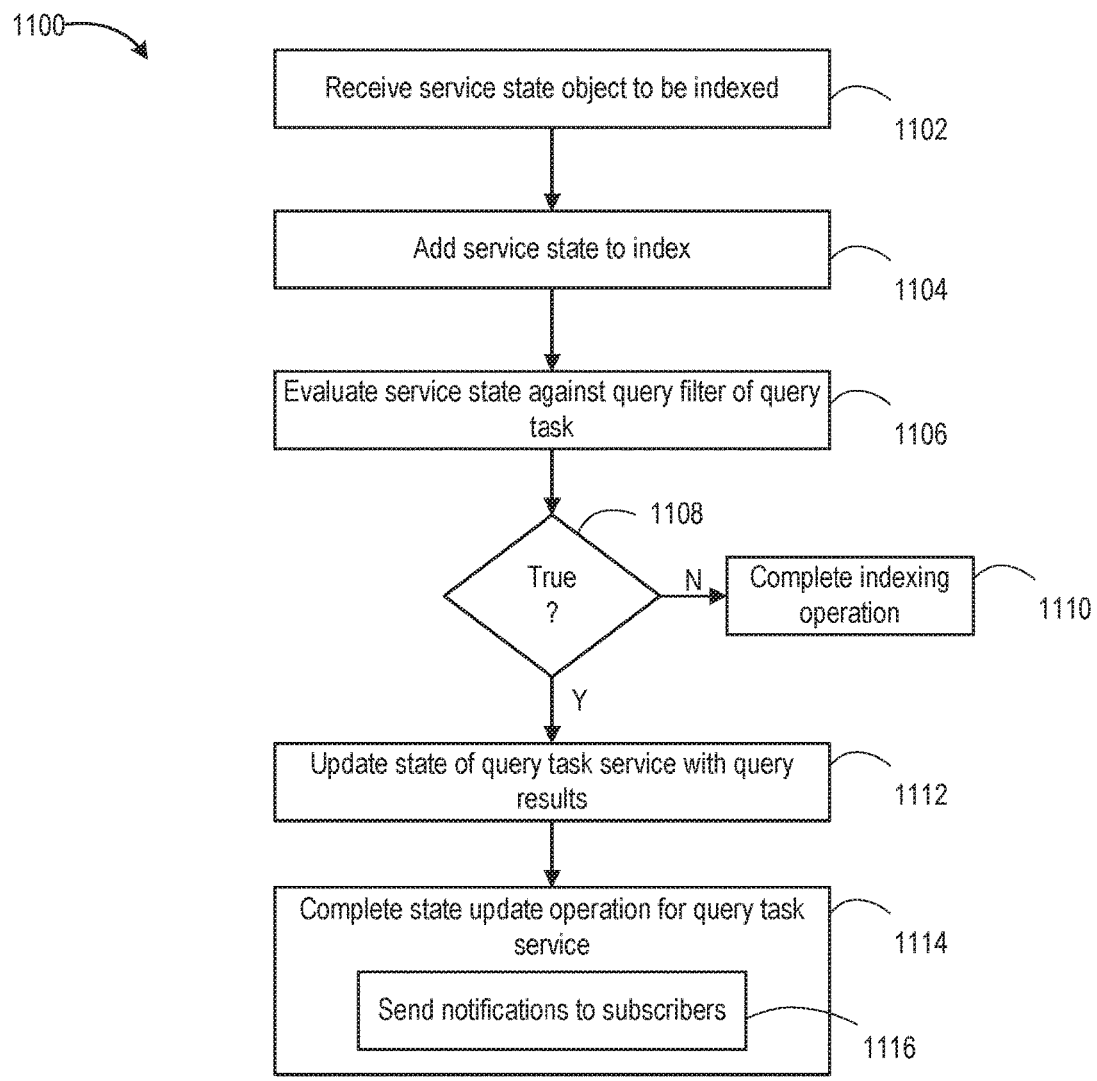
FIG. 11 is a flow diagram depicting a method of storing service documents in a document store according to an embodiment.

FIGS. 8-11 depict a technique of notification in a control plane according to an embodiment. FIG. 8 is a flow diagram depicting a method 800 of creating a query task service. FIG. 9 is a block diagram a portion 900 of service host process 300 according to an embodiment. FIG. 10 is a flow diagram depicting a method 1000 of processing query results according to an embodiment. FIG. 11 is a flow diagram depicting a method 1100 of storing service documents in a document store according to an embodiment.

Method 800 is an example of the process performed when creating a query task service. Prior to execution of method 800, a user executes a service host process (e.g., node 206) on software platform 103 of host computer 150. Further, runtime 302 creates service objects (e.g., service objects 301M) and service state objects (e.g., service document objects 364) for various services.

With reference to FIGS. 8 and 9, method 800 begins at step 802, where runtime 302 receives a request to create a query task ("query task request") based on a query specification defining a query task. In an embodiment, a client (e.g., a user or service) issues a POST request targeting the query task service factory (e.g., http://localhost:8000/core/query-tasks). The body of the POST request includes a query specification defining the query task. Runtime 302 forwards the POST request to query task service factory object 322 in service host process 300.

At step 804, in response to the query task request, runtime 302 creates and starts a query task service and initializes its service state based on the query specification. In an embodiment, runtime 302 creates a query task service object 901 to implement an instance of the query task service. Runtime 302 also creates a query task object 918 to hold the service state of the query task service, which includes the query task. Query task object 918 includes a query specification 910 and a task state 922. Query specification 910 stores the query specification of the query task request. Task state 922 stores an identifier for the current state of the query task (e.g., created, started, finished, etc.).

Query specification 910 includes a query 912 and options 916 obtained from the query task request. Query 912 includes one or more terms and optionally one or more connectors. Each term includes a service document field and a value, which can be a wildcard. Query specification 910 can also include a query filter 914 corresponding to query 912. Query filter 914 facilitates testing whether query 912 matches a given service document object. Query filter 914 evaluates to true if a service state satisfies query filter 914 and false otherwise. Options 916 are used to define the result set of the query task. Query task object 918 includes a results object (results 920) configured to store the result set. In general, the result set is empty or includes at least a portion of each of one or more service documents.

Options 916 can include, for example, CONTINUOUS, COUNT, EXPAND_CONTENT, INCLUDE_ALL_VERSIONS. The CONTINUOUS option configures the query task as a continuous query task. For continuous query tasks, results 920 are updated in real time by applying query filter 914 to service documents as they are added to document store 352. Results 920 are updated with at least a portion of each service document being indexed that satisfies query filter 914. Continuous queries are discussed further below.

The COUNT option dictates that results 920 will include the number of service documents returned in response to query 912. The EXPAND_CONTENT option dictates that results 920 will include all content of the service document(s) returned in response to query 912. The INCLUDE_ALL_VERSIONS option dictates that results 920 will include all versions of the service document(s) returned in response to query 912. Framework 212 can include various other options 916 to define the result set for a query task service.

The creation of query task service object 901 follows the service object lifecycle 500 shown in FIG. 5. Thus, runtime 302 creates query task service object 901 (stage 502), initializes query task object 918 with initial service state (stage 506) based on the request, calls a start handler 904 of query task service object 901 (stage 512), and indexes the initial service state stored by query task object 918 (stage 514). Thereafter, query task service object 901 becomes available to handle requests (stage 516).

At step 806, start handler 904 completes the query task request and returns a response to the client (e.g., a user or service making the request). In an embodiment, start handler 904 sets task state 922 to "created." Start handler 904 also completes the POST request targeting the query task service factory. Runtime 302 returns a response to the client indicating that the query task has been successfully created. If there is a failure during steps 804 or 806, runtime 302 would return a response to the client indicating the query task creation has failed.

At step 808, start handler 904 starts the query task, which is forwarded to the index service for processing. In an embodiment, start handler 904 sends a PATCH request targeting the query task service to update task state 922 to "started." Runtime 302 invokes a patch handler 908 of query task service object 901 to handle the PATCH request. Patch handler 908 sets task state 922 in query task object 918 to "started" and sends a request to the index service to process the query task. In an embodiment, patch handler 908 sends a PATCH request that targets the index service and includes a reference to query task object 918.

At step 810, the index service processes the query task. In an embodiment, runtime 302 forwards the PATCH request sent by patch handler 908 to index service object 330. Index service object 330 includes a query task patch handler 924 that is invoked to handle the PATCH request sent by patch handler 908. Query task patch handler 924 executes query 912 to obtain a query results according to options 916 (e.g., at least a portion of one or more service documents, if any). At step 812, if the CONTINUOUS option is set, the index service adds the query task to a list of active queries. In an embodiment, query task patch handler 924 adds the query task object 918 to an active queries list 930. Query task patch handler 924 invokes a query completion handler 909, providing the query results as input.

At step 814, query completion handler 909 processes the query results. In an embodiment, query completion handler 909 updates results 920 of query task object 918 to store the query results. An embodiment of processing the query results returned from the index service is described below with respect to FIG. 10.

Referring to FIG. 10, method 1000 can be performed by query completion handler 909 in step 814 in method 800. Method 1000 begins at step 1002, where query completion handler 909 receives the query results from the index service. At step 1004, query completion handler 909 updates results 920 of query task object 918 to store the query results. At step 1006, query completion handler 909 determines whether the query task should be retried. In an embodiment, a client can specify in the query task request that the query task return an expected number of results. If the query results do not include the expected number of results, the query task can be retried. If at step 1006 the query task should be retried, method 1000 proceed to step 1008, where query completion handler 909 schedules the query task to be forwarded to the index service for processing (e.g., steps 808-814 are performed again for the query task). If the query task is not to be retried, method 1000 proceeds to step 1010.

At step 1010, the query completion handler 909 schedules the query task for expiration. In an embodiment, a query task is scheduled for expiration by scheduling a DELETE request targeting the query task service that manages the query task. At step 1012, query completion handler 909 determines whether the query task is a continuous query task. If so, method 1000 proceeds to step 1014, where query completion handler 909 maintains task state 922 as "started." Otherwise, method 1000 proceeds to step 1016, where query completion handler 909 sets task state 922 to "finished." At step 1016, query completion handler 909 can also store the query results in a result cache 902 of query task service object 901. A get handler 906 of query task service object 901 can return query results from result cache 902. Method 1000 proceeds from either step 1014 or step 1016 to step 1018.

At step 1018, runtime 302 completes the service state update operation for the query task service. In an embodiment, the query task service is created as a replicated service. Runtime 302 can perform the following actions in response to service state update of a replicated service: 1) evolve state version and update time; 2) replicate state version across nodes in the node group; 3) save the service state to document store 352; 4) publish a notification to subscribers; and 5) return a response to the client. As described above in method 800, the client that requested update of the service state for the query task service is the index service. Thus, no query results are directly returned to the client of the original query task request. Rather, the client of the original query task request can obtain the query results by subscribing to receive the notification, by sending a GET request to the query task service (which is handled by a get handler 906 of query task service object 901), or by directly querying the index service for the service state of the query task service.

Referring to FIG. 11, method 1100 begins at step 1102, where the index service receives a service state object to be indexed. Runtime 302 sends a POST request to the index service to index service state for a service anytime the service state is updated (e.g., through a POST, PUT, or PATCH request). Thus, method 1100 can be performed each time a service has its service state updated.

At step 1102, the index service adds the service state stored by the service state object to the index (e.g., document store 352). In an embodiment, an add document to index function 926 of index service object 330 is invoked to add the service state to the document store 352. At step 1104, the index service evaluates the service state being indexed against query filter of a query task. In an embodiment, an apply active queries function 928 applies a query filter of each query task object in active queries list 930 to the service state being indexed. For example, apply active queries function 928 applies query filter 914 of query task object 918 when options 916 of query specification 910 include a CONTINUOUS option, as described above.

At step 1108, index service determines whether the query filter evaluated as true. If not, method 1100 proceeds to step

1110, where index service completes the indexing operation. Otherwise, method 1100 proceeds to step 1112, where index service updates the service state of query task service with the query results. In an embodiment, apply active queries function 928 sends a PATCH request to the query task service to update its service state with the new query results. Patch handler 908 sets results 920 to store the new query results. At step 1114, runtime 302 completes the service state update operation for the query task service. Runtime 302 performs the actions described above with respect to step 1018. In particular, at step 1116, runtime 302 sends notifications to subscribers of query task service. The notification can include all or a portion of the latest service state of the query task service. In this manner, a continuous query task continues to capture service state updates that satisfy its query filter until the query task expires or is otherwise cancelled by the client.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing notifications in a control plane of a computer system, comprising:
 executing a service host process of the control plane on a software platform of the computer system, the service host process managing services of the control plane and a persistent document store that stores service states for the services;
 creating a query task service of the control plane in addition to the services, a service state of the query task service including a query filter;
 evaluating each service state of the services against the query filter as each service state of the services is added to the persistent document store;
 updating the service state of the query task service for each of the service states that satisfies the query filter; and
 sending a notification to a plurality of subscribers of the query task service in response to each update to the service state of the query task service.

2. The method of claim 1, wherein the query task comprises a query specification, and wherein the method further comprises generating the query filter from the query specification.

3. The method of claim 2, wherein the query specification includes a description of a query and at least one option associated with the query.

4. The method of claim 3, wherein the steps of evaluating and updating are performed in response to the at least one option including a continuous option.

5. The method of claim 1, wherein the service host process includes an index service object that implements an index service of the control plane, and wherein the method further comprises:
 adding the query task to a list of active queries of the index service object;
 wherein the step of evaluating is a function of the index service object performed in response to the query task being in the list of active queries.

6. The method of claim 5, wherein the step of updating is performed by a handler of a service object in the service host process that implements the query task service, and wherein the index service object invokes the handler for each of the service states that satisfies the query filter.

7. The method of claim 1, wherein the step of updating the service state of the query task service comprises:
 for each service state that satisfies the query filter, updating a results object of the service state of the query task service to store at least a portion of the respective service state.

8. The method of claim 1, wherein each notification comprises the service state of the query task service.

9. The method of claim 1, wherein each of the plurality of subscribers is a client of the control plane or one of the services of the control plane.

10. A computer system, comprising:
 a hardware platform having a central processing unit (CPU), memory, and storage;
 a software platform executing on the hardware platform, the software platform includes a service host process of a control plane, the service host process executable by the CPU to:
  manage services of the control plane and a persistent document store in the storage that stores service states for the services;
  create a query task service of the control plane in addition to the services, a service state of the query task service including a query filter;
  evaluate each service state of the services against the query filter as each service state of the services is added to the persistent document store;
  update the service state of the query task service for each of the service states that satisfies the query filter; and
  send a notification to a plurality of subscribers of the query task service in response to each update to the service state of the query task service.

11. The computer system of claim 10, wherein the query task comprises a query specification, and wherein the service host process is further executable by the CPU to generate the query filter from the query specification.

12. The computer system of claim 11, wherein the query specification includes a description of a query and at least one option associated with the query.

13. The computer system of claim 12, wherein the service host process is executable by the CPU to evaluate each of the service states and update the service state of the query task service in response to the at least one option including a continuous option.

14. The computer system of claim 10, wherein the service host process is executable by the CPU to:
 manage an index service object that implements an index service of the control plane; and
 add the query task to a list of active queries of the index service object;
 wherein the service host process is executable by the CPU to evaluate each of the service states using a function of the index service object performed in response to the query task being in the list of active queries.

15. The computer system of claim 14, wherein the service host process is executable by the CPU to update the service state of the query task service using a handler of a service object in the service host process that implements the query task service, and wherein the index service object invokes the handler for each of the service states that satisfies the query filter.

16. The computer system of claim 10, wherein the service host process is executable by the CPU to update the service state of the query task service by:
 for each service state that satisfies the query filter, updating a results object of the service state of the query task service to store at least a portion of the respective service state.

17. The computer system of claim 10, wherein each notification comprises the service state of the query task service.

18. The computer system of claim 10, wherein each of the plurality of subscribers is a client of the control plane or one of the services of the control plane.

19. A non-transitory computer readable medium comprising instructions, which when executed in a computer system, causes the computer system to carry out a method of providing notifications in a control plane of a computer system, comprising:
 executing a service host process of the control plane on a software platform of the computer system, the service host process managing services of the control plane and a persistent document store that stores service states for the services;

creating a query task service of the control plane in addition to the services, a service state of the query task service including a query filter;

evaluating each service state of the services against the query filter as each service state of the services is added to the persistent document store;

updating the service state of the query task service for each of the service states that satisfies the query filter; and sending a notification to a plurality of subscribers of the query task service in response to each update to the service state of the query task service.

20. The non-transitory computer readable medium of claim 19, wherein the service host process includes an index service object that implements an index service of the control plane, and wherein the method further comprises:

adding the query task to a list of active queries of the index service object;

wherein the step of evaluating is a function of the index service object performed in response to the query task being in the list of active queries.

* * * * *